(12) United States Patent
Ke et al.

(10) Patent No.: US 12,218,566 B2
(45) Date of Patent: Feb. 4, 2025

(54) TENSION STRUCTURE AND DRUM MOTOR

(71) Applicants: SUZHOU ZHAOWEI INDUSTRIAL TECHNOLOGY CO., LTD., Jiangsu (CN); SHENZHEN ZHAOWEI MACHINERY & ELECTRONICS CO., LTD., Guangdong (CN)

(72) Inventors: Shanyao Ke, Guangdong (CN); Weiqun Xie, Guangdong (CN)

(73) Assignees: SUZHOU ZHAOWEI INDUSTRIAL TECHNOLOGY CO., LTD., Jiangsu (CN); SHENZHEN ZHAOWEI MACHINERY & ELECTROICS CO., LTD., Guangdong (CN)

( * ) Notice: Subject to any disclaimer, the term of this patent is extended or adjusted under 35 U.S.C. 154(b) by 0 days.

(21) Appl. No.: 18/714,429

(22) PCT Filed: Jun. 27, 2023

(86) PCT No.: PCT/CN2023/102605
§ 371 (c)(1),
(2) Date: May 29, 2024

(87) PCT Pub. No.: WO2024/169101
PCT Pub. Date: Aug. 22, 2024

(65) Prior Publication Data
US 2024/0421660 A1 Dec. 19, 2024

(30) Foreign Application Priority Data
Feb. 15, 2023 (CN) .......................... 202310151068.9

(51) Int. Cl.
*H02K 7/14* (2006.01)

(52) U.S. Cl.
CPC ..................................... *H02K 7/14* (2013.01)

(58) Field of Classification Search
CPC . H02K 7/003; H02K 7/10; H02K 7/14; F16D 1/104; B65G 13/04; B65G 13/06; B65G 13/07; B65G 13/071; B65G 13/08
See application file for complete search history.

(56) References Cited

U.S. PATENT DOCUMENTS

2006/0151299 A1\* 7/2006 Schaefer ................ B65G 13/02
198/788
2011/0062000 A1\* 3/2011 Yamamoto ............ B65G 23/08
198/789

(Continued)

FOREIGN PATENT DOCUMENTS

CN 204316244 5/2015
CN 207594549 7/2018

(Continued)

*Primary Examiner* — Eric Johnson
(74) *Attorney, Agent, or Firm* — Brooks Kushman P. C.

(57) ABSTRACT

The tension structure is used for connecting a drive part with a rotating part. The tension structure is able to drive the rotating part to rotate about a rotation axis under a driving of the drive part, and the tension structure includes: a first connection part, in transmission connection with the drive part; a limit part, including a bottom wall and a side wall arranged at a periphery of the bottom wall, in which the side wall defines therein installation slots; and the bottom wall is detachably connected to the first connection part to enable the side wall to sleeve outside the first connection part; and tension parts, engaged with the installation slots, respectively. A side of each of the tension parts facing away from the first connection part protrudes from a corresponding installation slot and presses against the rotating part.

13 Claims, 4 Drawing Sheets

(56) References Cited

U.S. PATENT DOCUMENTS

| | | | | |
|---|---|---|---|---|
| 2013/0334012 A1* | 12/2013 | Lindemann | ............ | B65G 13/06 |
| | | | | 29/895.2 |
| 2015/0210480 A1* | 7/2015 | Lindemann | ............ | B65G 39/02 |
| | | | | 29/895.21 |
| 2016/0312836 A1* | 10/2016 | Itoh | ........................ | B65G 23/08 |
| 2020/0102151 A1* | 4/2020 | Lindemann | ............. | F16D 1/104 |
| 2020/0270065 A1* | 8/2020 | Dorok | .................... | B65G 39/07 |
| 2020/0346868 A1* | 11/2020 | K.S | ........................ | B65G 13/04 |

FOREIGN PATENT DOCUMENTS

| | | |
|---|---|---|
| CN | 108768094 | 11/2018 |
| CN | 215409999 | 1/2022 |
| CN | 115470584 A | 12/2022 |
| CN | 218216989 | 1/2023 |
| CN | 116054478 A | 5/2023 |
| CN | 219812024 | 10/2023 |
| EP | 0636815 A1 | 2/1995 |

* cited by examiner

TENSION STRUCTURE AND DRUM MOTOR

CROSS-REFERENCE TO RELATED APPLICATIONS

The present application is the U.S. national phase of International Application No. PCT/CN2023/102605 with an international filing date of Jun. 27, 2023, designating the U.S., now pending, and claims priority to the Chinese patent application filed with the China Patent Office on Feb. 15, 2023, with an application number 2023101510689 and titled "TENSION STRUCTURE AND DRUM MOTOR", the contents of which are incorporated herein by reference.

TECHNICAL FIELD

The present application relates to the technical field of conveying equipment, and in particular to a tension structure and a drum motor.

BACKGROUND

A drum motor is often used in various scenarios for conveying heavy objects. Due to the particularity of use thereof, the drum motor is required to withstand relatively large torques, which imposes high requirements on the connection strength between the power output part of the drive part and the drum.

In the existing technology, the interference fit manner between the drum and the motor-driven sleeve is often used, that is, a sleeve having a diameter slightly greater than an inner diameter of the drum is pressed in using a tool and a certain radial pressure is generated. When the sleeve or the drum is subjected to an external force, a relatively large friction is generated, thereby achieving a fixed connection between the drum and the sleeve. However, this connection manner requires high processing accuracy of the sleeve and drum, and requires processing of corresponding tooling, which results in high cost and complicated disassembly and assembly.

SUMMARY

Technical Problems

It is an object of the present application to provide a tension structure and a drum motor, so as to tackle the technical problem that the connection manner between the drum and the sleeve in the existing drum motor imposes high requirements on the processing accuracy and has complex disassembly and assembly.

Technical Solutions

Embodiments of a first aspect of the present application provide a tension structure for connecting a drive part with a rotating part. The tension structure is able to drive the rotating part to rotate about a rotation axis under a driving of the drive part, and the tension structure comprises:
- a first connection part, in transmission connection with the drive part;
- a limit part, comprising a bottom wall and a side wall arranged at a periphery of the bottom wall, in which, the side wall defines therein installation slots, the bottom wall is detachably connected to the first connection part to enable the side wall to sleeve outside the first connection part; and
- tension parts, engaged with the installation slots, respectively, in which, a side of each of the tension parts facing away from the first connection part protrudes from a corresponding installation slot and presses against the rotating part.

In an embodiment, in a direction of the rotation axis, a length of each of the installation slots is smaller than a length of each of the tension parts.

In an embodiment, a side of each of the tension parts facing away from the first connection part has concavo-convex patterns.

In an embodiment, the side wall comprises a plurality of convex columns which are spaced apart from adjacent ones, sides of each of the plurality of convex columns facing toward adjacent convex columns are provided with grooves, respectively, and each of the grooves and an opposite groove of an adjacent convex column form an installation slot having an installation port; and
each of the tension parts comprises limit bosses spacedly arranged at two sides thereof; and the limit bosses are engaged with corresponding grooves, and the tension parts are inserted into the installation slots through the installation ports, respectively.

In an embodiment, along a direction of the rotation axis, the first connection part comprises a first section and a second section in connection with each other; a diameter of the first section is smaller than a diameter of the second section, a step surface is formed at a connection portion between the first section and the second section; and
the side wall is sleeved outside the first section, and an end of the side wall away from the bottom wall presses against the step surface.

In an embodiment, the first connection part further comprises fitting portions protruding from an outer side wall of the first section; each of the fitting portions comprises a first fitting inclined plane; and
each of the tension parts is in slidable connection with a corresponding fitting portion; each of the tension parts comprises a second fitting inclined plane; an extending direction of the second fitting inclined plane is inclined to a sliding direction of a corresponding tension part; and the second fitting inclined plane is parallel to and in contact with a corresponding first fitting inclined plane.

In an embodiment, a receiving chamber is defined in both the first section and the second section, and the first connection part further comprises a connection portion arranged in the receiving chamber; a through hole is defined in the bottom wall; and
the tension structure further comprises a fastener, and the fastener passes through the through hole and is in connection with the connection portion.

In an embodiment, the tension structure further comprises an elastic part and a second connection part accommodated in the receiving chamber; the elastic part is sleeved on the second connection part and engaged with the second section, and the second connection part is configured to connect an output end of the drive part.

The above-described tension structure comprises: the first connection part, the limit part, and the tension parts. The first connection part is in transmission connection with the drive part and rotates around the rotation axis, and the bottom wall of the limit part is detachably connected to the first connection part, and the tension parts are respectively engaged with the installation slots defined in the side wall of the limit part, such that both the tension parts and the limit part can follow the first connection part to rotate around the rotation axis, and the tension parts and the limit part are easy to be disassembled and assembled. In addition, since the side of each of the tension parts away from the first connection part protrudes from the corresponding installation slot and can press against the rotating part, a reliable friction between each of the tension parts and the rotating part can be generated and a fixed connection therebetween can be realized, thereby driving the rotating part to rotate around the rotation axis. This connection manner has low requirements on the shape of the tension structure, such that the processing accuracy requirement is reduced and it is solved the technical problem that the connection manner between the drum and the sleeve in the existing drum motor imposes high requirements on the processing accuracy and has complex disassembly and assembly.

Embodiments of a second aspect of the present application provide a drum motor, comprising the tension structure according to any embodiment of the first aspect.

In an embodiment, the rotating part is a drum, and the drum defines therein an accommodation chamber; and
the drum motor further comprises a drive part and a transmission part; the drive part, the transmission part, and the tension structure are all accommodated in the accommodation chamber and connected in sequence; and the tension parts of the tension structure press against an inner side wall of the drum.

The above-described drum motor adopts a reliable friction between each of the tension parts and the rotating part to realize a fixed connection therebetween, thereby driving the rotating part to rotate around the rotation axis. This connection manner has low requirements on the shape of the tension structure, such that the processing accuracy requirement is reduced and it is solved the technical problem that the connection manner between the drum and the sleeve in the existing drum motor imposes high requirements on the processing accuracy and has complex disassembly and assembly. Moreover, the number of the tension parts and the fitting portions can be increased or decreased to meet different requirements for friction and improve applicability.

BRIEF DESCRIPTION OF THE DRAWINGS

In order to more clearly illustrate the technical solutions in the embodiments of the present application, the drawings that need to be used in the description of the embodiments or the prior art will be briefly described hereinbelow. Obviously, the accompanying drawings in the following description are only some embodiments of the present application. For those skilled in the art, other drawings can be obtained based on these drawings without creative work.

Figure 1:
FIG. 1 is a schematic diagram of a drum motor provided by an embodiment of the present application.

Meaning of reference numerals are explained as follows:
100, drum motor;
10, tension structure; 11, first connection part; 111, first section; 112, second section; 113, step surface; 114, fitting portion; 1141, first fitting inclined plane; 115, receiving chamber; 116, connection portion; 12, limit part; 121, bottom wall; 122, side wall; 1221, convex column; 123, installation slot; 124, installation port; 13, tension part; 131, limit bosses; 132, second fitting inclined plane; 14, fastener; 15, elastic part; 16, second connection part;
20, drive part; 21, internally toothed motor casing;
30, rotating part; 31, accommodation chamber;
40, transmission part; 41, casing; 42, deceleration part; 421, sun gear; 422, planetary gear; 423, planetary gear bracket; 424, bare axle; 425, rolling member; 43, output shaft; 44, first bearing; 45, annular elastic ring;
50, drive part fixing mechanism; 51, motor fixing part; 52, motor connection part; 53, motor connection fitting part;
60, rotating part support mechanism; 61, fixing part; 62, adapter sleeve; and 63, second bearing.

DETAILED DESCRIPTION OF THE EMBODIMENTS

In order to make the purposes, technical solutions, and advantages of the present application clearer and more understandable, the present application will be further described in detail hereinafter with reference to the accompanying drawings and embodiments. It should be understood that the embodiments described herein are only intended to illustrate but not to limit the present application.

It should be noted that when an element is described as "fixed" or "arranged" on/at another element, it means that the element can be directly or indirectly fixed or arranged on/at another element. When an element is described as "connected" to/with another element, it means that the element can be directly or indirectly connected to/with another element.

It should be understood that terms "length", "width", "upper", "lower", "inside", "outside" and the like indicating orientation or positional relationship are based on the orientation or the positional relationship shown in the drawings, and are merely for facilitating and simplifying the description of the present application, rather than indicating or implying that a device or component must have a particular orientation, or be configured or operated in a particular orientation, and thus should not be construed as limiting the application. In the description of the present application, "multiple"/"a plurality of" refers to the number of two or more than two, unless otherwise clearly and specifically defined.

In the present application, unless otherwise specifically stipulated and defined, terms like "install", "connect", "couple", "fix" should be construed broadly, for example, they may indicate a fixed connection, a detachable connection, or an integral as a whole; may be a mechanical connection, or an electrical connection; may be in direct connection, or indirect connection via an intermediate, and may also reflect internal communication of two elements or interactions between two elements. For those skilled in the art, the specific meanings of the above terms in the present application can be understood according to specific conditions.

Embodiments of a first aspect of the present application provides a tension structure, which is used for connecting a drive part with a rotating part, thereby providing a driving force for rotation of the rotating part through the drive part.

Referring to FIGS. 1-4, in an embodiment of the present application, the tension structure 10 is configured to drive a rotating part 30 to rotate about a rotation axis L under a driving of a drive part 20. The rotation axis L overlaps with a central axis of the rotating part 30. The tension structure 10 comprises: a first connection part 11, a limit part 12, and tension parts 13.

The first connection part 11 is in transmission connection with the drive part 20. Specifically, the first connection part 11 is in transmission connection with an output end of the drive part 20. Since the output end of the drive part 20 rotates about the rotation axis L, the first connection part 11 is also driven to rotate about the rotation axis L.

The limit part 12 comprises a bottom wall 121 and a side wall 122 arranged at a periphery of the bottom wall 121. The side wall 122 defines therein installation slots 123. The bottom wall 121 is detachably connected to the first connection part 11 to enable the side wall 122 to sleeve outside the first connection part 11.

The tension parts 13 are engaged with the installation slots 123, respectively, and a side of each of the tension parts 13 facing away from the first connection part 11 protrudes from a corresponding installation slot 123 and presses against the rotating part 30. That is to say, in a direction perpendicular to the rotation axis L, each of the tension parts 13 protrudes from the corresponding installation slot 123.

Specifically, the bottom wall 121 of the limit part 12 can be connected to the first connection part 11 through a snap connection or a threaded connection, which is easy to disassemble and assemble and enables the limit part 12 to rotate along with the rotation of the first connection part 11 about the rotation axis L. Since the tension parts 13 are respectively engaged with the installation slots 123 defined in the side wall 122, when the side wall 122 of the limit part 12 is sleeved on the first connection part 11, the tension parts 13 follow the first connection part 11 to rotate around the axis of rotation L. In addition, since the side of each of the tension parts 13 away from the first connection part 11 protrudes from the corresponding installation slot 123 and may press against the rotating part 30, the tension parts 13 are fixedly connected to the rotating part 30, moreover, the tension structure 10 functions in transmitting power and providing support for driving the transmission part 40. That is to say, the rotating part 30 is driven by the tension structure 10 to rotate around the rotation axis L.

It can be understood that reliable friction is generated between the each of the tension parts 13 and the rotating part 30 so as to achieve a fixed connection.

In this embodiment, the rotating part 30 is a drum. It can be understood that in other embodiments of the present application, the rotating part 30 may also be a belt or other structure wound around the tension structure 10.

The above-described tension structure 10 comprises: the first connection part 11, the limit part 12, and the tension parts 13. The first connection part 11 is in transmission connection with the drive part 20 and rotates around the rotation axis L, and the bottom wall 121 of the limit part 12 is detachably connected to the first connection part 11, and the tension parts 13 are respectively engaged with the installation slots 123 defined in the side wall 122 of the limit part 12, such that both the tension parts 13 and the limit part 12 can follow the first connection part 11 to rotate around the rotation axis L, and the tension parts 13 and the limit part 12 are easy to be disassembled and assembled. In addition, since the side of each of the tension parts 13 away from the first connection part 11 protrudes from the corresponding installation slot 123 and can press against the rotating part 30, a reliable friction between each of the tension parts 13 and the rotating part 30 can be generated and a fixed connection therebetween can be realized, thereby driving the rotating part 30 to rotate around the rotation axis L. This connection manner has low requirements on the shape of the tension structure 10, such that the processing accuracy requirement is reduced and it is solved the technical problem that the connection manner between the drum and the sleeve in the existing drum motor imposes high requirements on the processing accuracy and has complex disassembly and assembly.

Referring to FIG. 1, FIG. 3 to FIG. 5, in an embodiment of the present application, in a direction of the rotation axis L, a length of each of the installation slots 123 is smaller than a length of each of the tension parts 13. Thus, when the tension parts 13 are arranged inside the installation slots 123, respectively, the tension parts 13 are squeezed and increase a radial pressure exerted on the rotating part 30, whereby ensuring the stability of the connection between each of the tension part 13 and the rotating part 30.

It can be understood that in other embodiments of the present application, in the direction of the rotation axis L, the length of each of the installation slots 123 can also be the same as the length of each of the tension parts 13, and the roughness of the side of each of the tension parts 13 facing towards the rotating part 30 can be increased to increase the radial pressure exerted on each rotating part 30, which is not limited herein.

Figure 3:
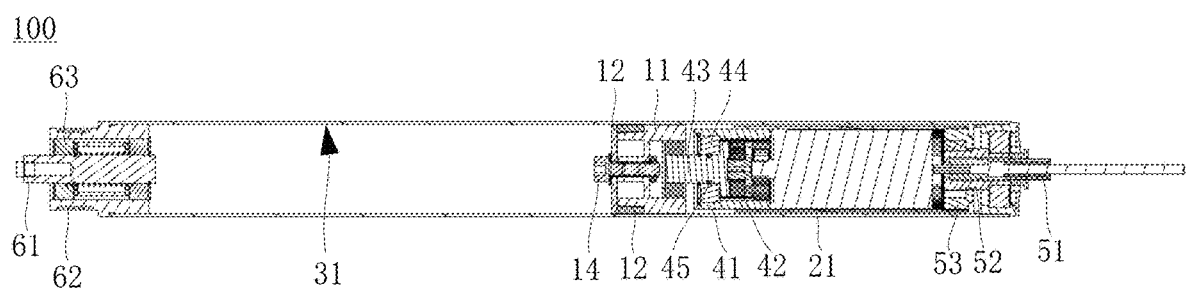
FIG. 3 is a schematic diagram of an internal structure of the drum motor as shown in FIG. 1.
Figure 4:
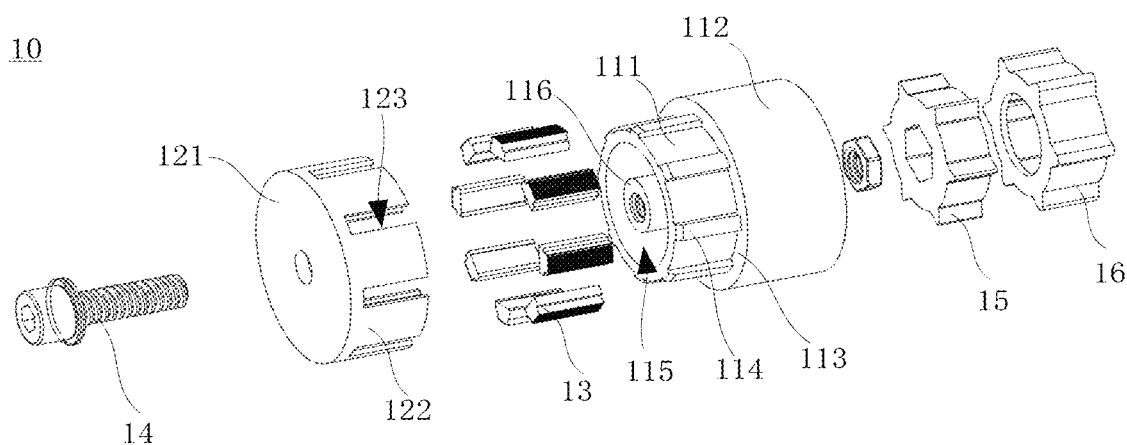
FIG. 4 is a three-dimensional exploded schematic diagram of a tension structure in the drum motor as shown in FIG. 2.

In order to provide a stable friction effect, referring to FIGS. 3-4, in an embodiment of the present application, a side of each of the tension parts 13 facing away from the first connection part 11 has concavo-convex patterns. That is to say, the side of each of the tension parts 13 facing away from the first connection part 11 has a rough surface. Since the concavo-convex patterns can increase the roughness of the surface of each tension part 13, in this way, the radial pressure exerted by each tension part 13 onto the rotating part 30 increases, and stability in the connection between the tension structure 10 and the rotating part 30 is improved.

In this embodiment, each of the tension parts 13 is made of a metal material, which has high mechanical strength, is not easily deformed during long-term extrusion, and makes the connection stable. It can be understood that in other embodiments of the present application, each of the tension parts 13 may also be a ceramic material, such as a zirconia ceramic and the like, or alternatively, each of the tension parts 13 may also be a metal-based composite material, which is not limited herein.

Further, the number of the installation slots 123 defined in the side wall 122 is plural, and the plurality of installation slots 123 are evenly distributed along a circumferential direction of the side wall 122. Correspondingly, the number of the tension parts 13 is plural and the plurality of tension parts are respectively received in the corresponding installation slots 123.

It can be understood that in other embodiments of the present application, the number of the tension parts 13 can also be other numbers, and the number of the tension parts 13 can be increased or decreased according to the requirement of the friction. Or alternatively, in another embodiment of the present application, the structure of each tension part 13 can also be other structures. For example, all the tension parts 13 together can present an annular arrangement as a whole. Correspondingly, the installation slots 123 are arranged around an outer circumferential surface of the first connection part 11. In such case, the radial pressure of the tension part 13 exerted on the rotating part 30 can be changed by replacing the tension parts 13 having different widths along the circumferential direction of the first connection part 11. Correspondingly, in order to ensure the stability of the connection between the tension parts 13 and the first connection part 11, when replacing the tension parts 13 having different widths along the circumferential direction of the first connection part 11, the limit part 12 provided with installation slots 123 having corresponding sizes must be adopted to replace the original one, which is not limited herein.

Figure 5:
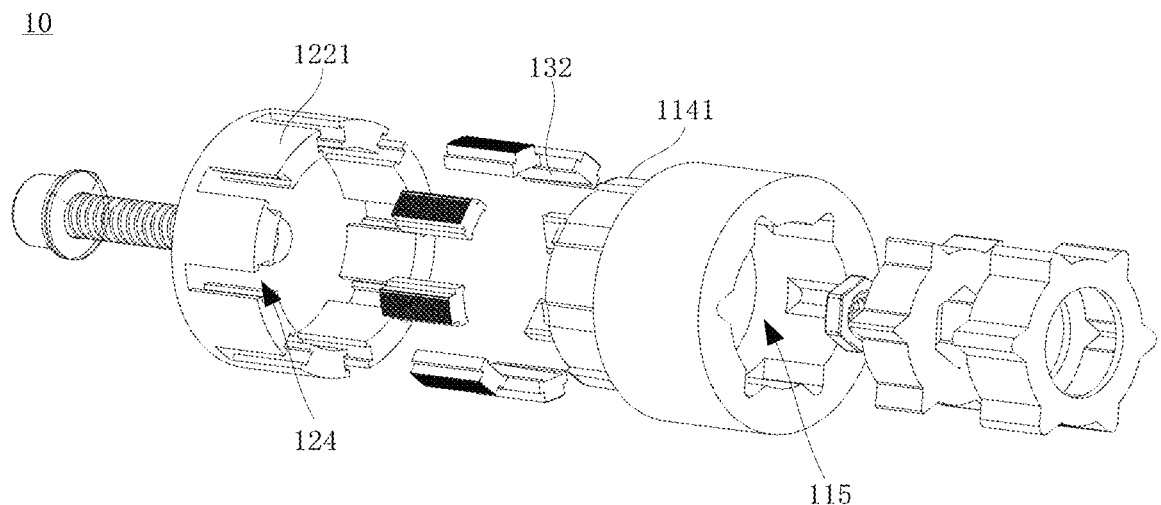
FIG. 5 is a three-dimensional exploded schematic diagram of the tension structure as shown in FIG. 4 from another angle.
Figure 6:
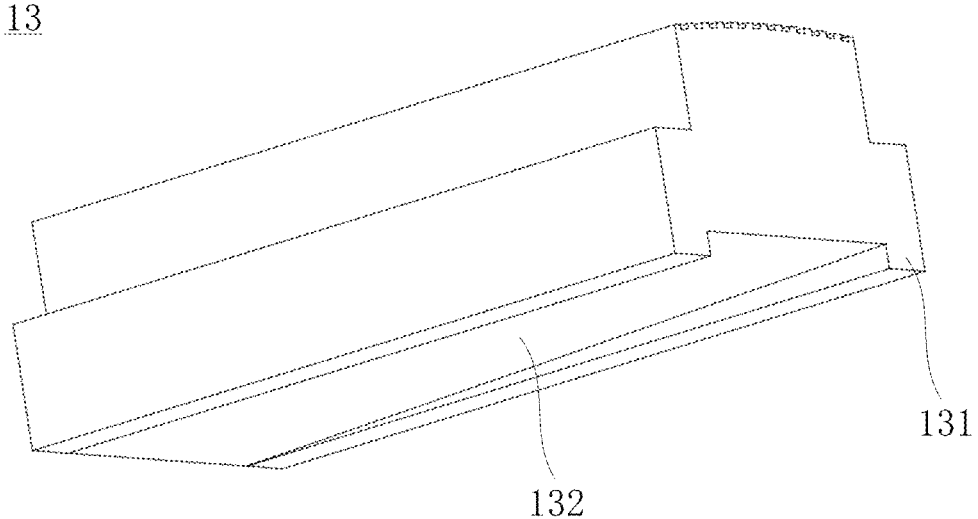
FIG. 6 is a three-dimensional schematic diagram of a tension part in the tension structure as shown in FIG. 4.

Referring to FIGS. 3-5, in an embodiment of the present application, the side wall 122 comprises a plurality of convex columns 1221 which are spaced apart from adjacent ones, sides of each of the plurality of convex columns 1221 facing toward adjacent convex columns 1221 are provided with grooves, respectively, and each of the grooves and an opposite groove of an adjacent convex column 1221 form an installation slot 123 having an installation port 124. Each of the tension parts 13 comprises limit bosses 131 spacedly arranged at two sides thereof. The limit bosses 131 are engaged with corresponding grooves, and the tension parts 13 can be inserted into the installation slots 123 through the installation ports 124, respectively. Thus, the grooves may function as mounting guides and limits for the limit bosses 131 received therein, such that the stability in connection between each of the tension parts 13 and the limit part 12 is increased, it is reduced the risk of the tension parts 13 from falling off, and the assembly and disassembly are simplified.

It is understood that the installation of the tension parts 13 should be completed before the limit part 12 is assembled with the first connection part 11.

It can be understood that in other embodiments of the present application, the structure of the limit part 12 can also be other structures. For example, the shapes of the grooves provided at both sides of each convex column 1221 facing toward different adjacent convex columns 1221 may be different; correspondingly, the shapes of the opposite sides of each of the tension parts 13 may also be different. In this way, the installation direction of each of the tension parts 13 can be limited, and the friction resistance between each of the tension parts 13 and the limit part 12 can be increased, thereby preventing the tension parts 13 from falling off easily.

Referring to FIGS. 3-5, in an embodiment of the present application, along the direction of the rotation axis L, the first connection part 11 comprises a first section 111 and a second section 112 in connection with each other. A diameter of the first section 111 is smaller than a diameter of the second section 112, and a step surface 113 is formed at a connection portion between the first section 111 and the second section 112. The side wall 122 is sleeved outside the first section 111, and an end of the side wall 122 away from the bottom wall 121 presses against the step surface 113. In this way, when the limit part 12 and the first connection part 11 are assembled, the step surface 113 can limit the installation of the limit part 12, so as to avoid the connection between the limit part 12 and the first connection part 11 from being too tight or from being not in place, thus ensuring an appropriate magnitude of a friction resistance between the tension part 13 and the rotating part 30.

In an embodiment, referring to FIGS. 3-6, the first connection part 11 further comprises fitting portions 114 protruding from an outer side wall of the first section 111. Each of the fitting portions 114 comprises a first fitting inclined plane 1141. Each of the tension parts 13 is in slidable connection with a corresponding fitting portion 114. Each of the tension parts 13 comprises a second fitting inclined plane 132. An extending direction of the second fitting inclined plane 132 is inclined to a sliding direction of a corresponding tension part 13. The second fitting inclined plane 132 is parallel to and in contact with a corresponding first fitting inclined plane 1141. That is to say, the extending direction of the first fitting inclined plane 1141 is also inclined to the sliding direction of the corresponding tension part 13.

In this way, the second fitting inclined plane 132 is in contact with the corresponding first fitting inclined plane 1141. Under the push of an external force, each tension part 13 can slightly slide on a corresponding fitting portion 114 along the corresponding first fitting inclined plane 1141. Due to the first fitting inclined plane 1141 is an inclined plane, each tension part 13 is squeezed when moving, which increases the pressure exerted on the inner wall of the rotating part 30, and the friction generated by the rough surface is utilized to drive the rotating part 30 to rotate. In addition, a firmer friction can be provided by axially arranging a plurality of the tension parts and a plurality of the fitting portions 114.

In this embodiment, the sliding direction of each of the tension parts 13 is parallel to the rotation axis L.

In this embodiment, the first connection part 11 comprises a plurality of fitting portions 114, which are evenly distributed along the circumferential direction of the first section 111 to adapt to the plurality of the tension parts 13, respectively. In this way, the tension parts 13 are also evenly distributed along the circumferential direction of the first section 111, such that the radial pressure of the tension structure 10 exerted on the rotating part 30 is evenly distributed, and the connection between the first connection part 11 and the rotating part 30 is stable. Along the sliding direction of the corresponding tension part 13, a height of each fitting portion 114 gradually increases from an end of the fitting portion 114 close to the bottom wall 121 to another end of the fitting portion 114 close to the second section 112.

In addition, the limit bosses 131 and the second fitting inclined plane 132 of each of the tension parts 13 form a sliding groove, and a corresponding fitting portion 114 can be accommodated in the sliding groove. In this way, when the limit part 12 and the tension part 13 are assembled, the sliding connection between the fitting portions 114 and the sliding grooves can realize the guiding function, such that the positions of the tension parts 13 can be limited to ensure accurate installation.

Referring to FIGS. 1-5, in an embodiment of the present application, a receiving chamber 115 is defined in both the first section 111 and the second section 112, and the first connection part 11 further comprises a connection portion 116 arranged in the receiving chamber 115. A through hole is defined in the bottom wall 121. The tension structure 10 further comprises a fastener 14, and the fastener 14 passes through the through hole and is in connection with the connection portion 116. In this way, the limit part 12 can be fixed through the connection between the fastener 14 and the connection portion 116, thereby achieving the fixation of the tension part 13.

The length of each of the tension parts 13 is slightly greater than the length of each of the fitting portions 114. In this embodiment, the fastener 14 passes through the through hole and is in threaded connection with the connection portion 116, and the fastener comprises a bolt and a nut. In this way, a simple connection structure can be realized through the threaded connection between the bottom wall 121 and the connection portion 116, which facilitates disassembly and assembly. When installing the tension structure 10, the bottom wall 121 squeezes the tension parts 13 by tightening the connection between the bolt and the nut. The tension parts 13 are squeezed by the bottom wall 121 and move along the corresponding fitting portions 114 in a direction away from the first connection part 11, that is, move in the vertical direction. Since the first fitting inclined planes 1141 are inclined planes, the tension parts 13 are squeezed when the tension parts 13 move in the horizontal direction, such that the pressure exerted on the rotating part 30 is increased, and the friction generated by the rough surface is adopted to drive the rotating part 30 to rotate.

In addition, the first section 111, the second section 112, the fitting portions 114, and the connection portion 116 are integrally formed, which has simple process and easy installation, and therefore facilitates timely replacement.

It can be understood that in other embodiments of the present application, the structure of the fastener 14 can also be other structures. For example, the fastener 14 can be fixed by snap connection, but is not limited to this.

Referring to FIGS. 2-5, in an embodiment of the present application, the tension structure 10 further comprises an elastic part 15 and a second connection part 16 accommodated in the receiving chamber 115. The elastic part 15 is sleeved on the second connection part 16 and engaged with the second section 112, and the second connection part 16 is configured to connect an output end of the drive part 20. In this way, the elastic part 15 can act as a shock absorber, thereby preventing an external force including a vibration which is exerted on the first connection part 11 from being transmitted to the second connection part 16 and the output shaft 43.

In this embodiment, the engagement between the second connection part 16 and the elastic part 15 and the engagement between the elastic part 15 and the second section 112 are all realized through a plurality of concave and convex structures, so as to make the relative positions of the second connection part 16, the elastic part 15, and the second section 112 remain unchanged, therefore the drive part 20 connected to the second connection part 16 can drive the first connection part 11 to rotate around the rotation axis L.

Specifically, the elastic part 15 defines therein an installation channel, and an outer surface of the second connection part 16 matches a shape of the installation channel. An outer surface of the elastic part 15 is provided with a plurality of protrusions, and the inner wall of the second section 112 defines therein a plurality of grooves matching the protrusions to realize the fixed connection between the elastic part 15 and the second section 112 and to limit the relative rotation of the elastic part 15 and the second section 112. It can be understood that in other embodiments of the present application, the shape of the second connection part 16, the shape of the elastic part 15, and the shape of the inner wall of the second section 112 may also be other shapes, which are not limited herein.

The above-described tension structure 10 comprises: the first connection part 11, the limit part 12, and the tension parts 13. The first connection part 11 is in transmission connection with the drive part 20 and rotates around the rotation axis L, and the bottom wall 121 of the limit part 12 is detachably connected to the first connection part 11, and the tension parts 13 are respectively engaged with the installation slots 123 defined in the side wall 122 of the limit part 12, such that both the tension parts 13 and the limit part 12 can follow the first connection part 11 to rotate around the rotation axis L, and the tension parts 13 and the limit part 12 are easy to be disassembled and assembled. In addition, since the side of each of the tension parts 13 away from the first connection part 11 protrudes from the corresponding installation slot 123 and can press against the rotating part 30, a reliable friction between each of the tension parts 13 and the rotating part 30 can be generated and a fixed connection therebetween can be realized, thereby driving the rotating part 30 to rotate around the rotation axis L. This connection manner has low requirements on the shape of the tension structure 10, such that the processing accuracy requirement is reduced and it is solved the technical problem that the connection manner between the drum and the sleeve in the existing drum motor imposes high requirements on the processing accuracy and has complex disassembly and assembly. Moreover, the number of the tension parts and the fitting portions 114 can be increased or decreased to meet different requirements for friction and improve applicability.

Embodiments of a second aspect of the present application provide a drum motor, comprising the tension structure according to any embodiment of the first aspect.

Figure 2:
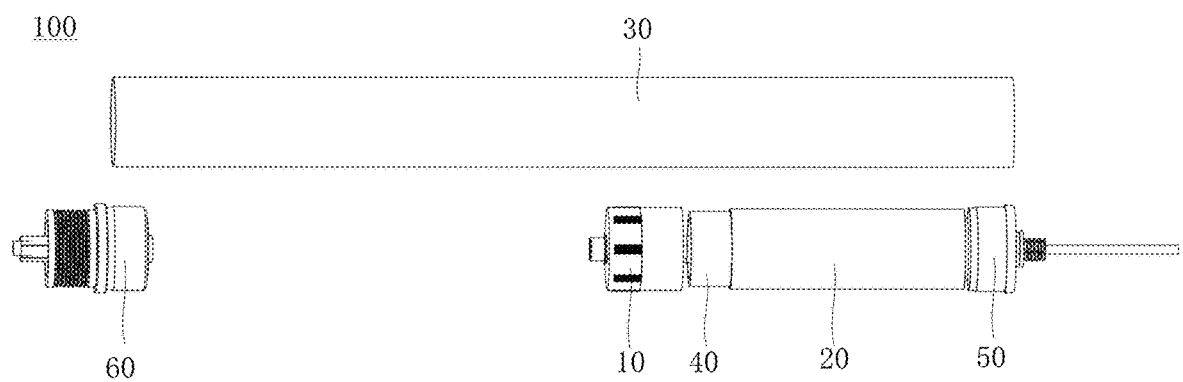
FIG. 2 is an exploded schematic diagram of the drum motor as shown in FIG. 1.

Referring to FIGS. 1-3, in an embodiment of the present application, the rotating part 30 is a drum, and the drum defines therein an accommodation chamber 31. The drum motor 100 further comprises a drive part 20 and a transmission part 40. The drive part 20, the transmission part 40, and the tension structure 10 are all accommodated in the accommodation chamber 31 and connected in sequence. The tension parts 13 of the tension structure 10 press against an inner side wall of the drum. In this way, the tension structure 10 can drive the drum to rotate under the drive of the drive part 20.

It can be understood that both the drive part 20 and the transmission part 40 have no direct contact with the drum. When the drive part 20, the transmission part 40, and the tension structure 10 are all accommodated in the accommodation chamber 31, the space occupied by the drum motor 100 can be saved.

Figure 7:
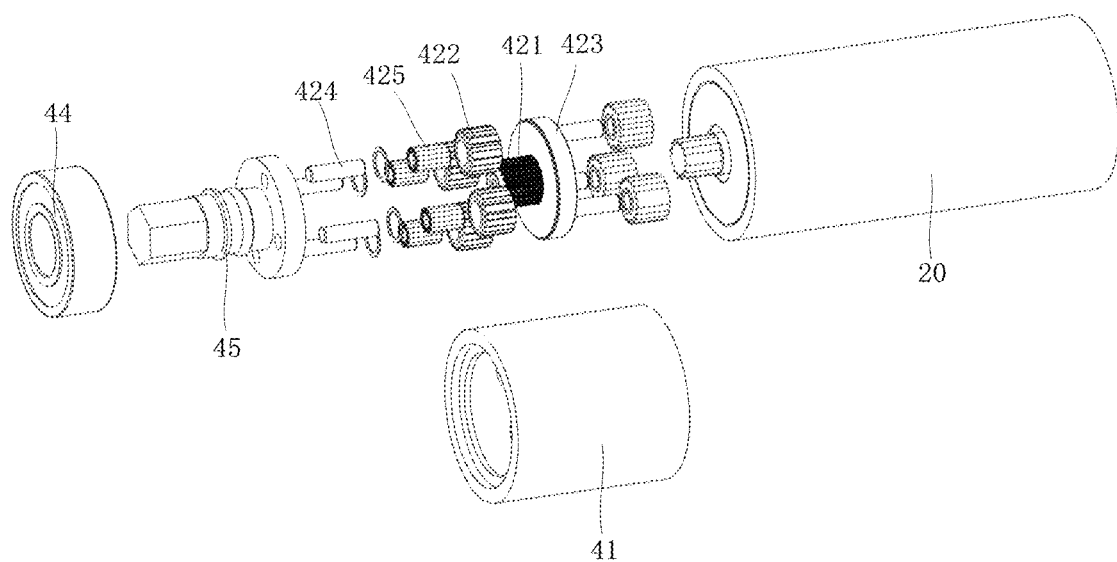
FIG. 7 is a three-dimensional exploded schematic diagram of a transmission part and a drive part in the drum motor as shown in FIG. 2.
Figure 8:
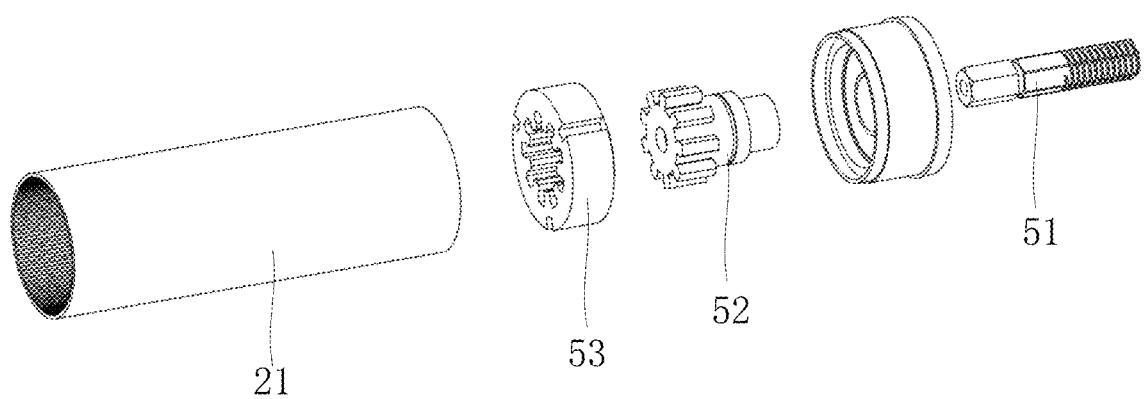
FIG. 8 is a three-dimensional exploded schematic diagram of a drive part fixing mechanism and an internally toothed motor casing in the drum motor as shown in FIG. 2.
Figure 9:
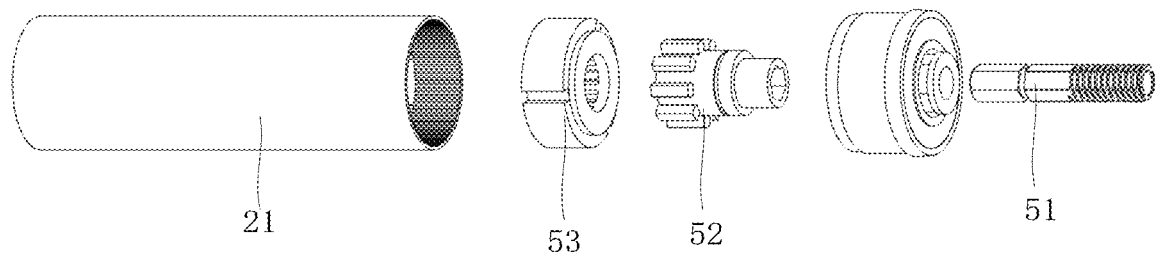
FIG. 9 is an exploded perspective view of the drive part fixing mechanism and the internally toothed motor casing as shown in FIG. 8 from another angle.

The transmission part 40 is a planetary gear box. Referring to FIG. 2, FIG. 3, and FIG. 7, the transmission part 40 comprises: a casing 41 having an inner toothed ring, a deceleration part 42 located in the casing 41, and an output shaft 43. The deceleration part 42 comprises: a sun gear 421 in fixed connection to the output end of the drive part 20, a plurality of planetary gears 422 arranged at a peripheral side of the sun gear 421, and a planetary gear bracket 423. Each of the plurality of planetary gears 422 meshes with both the sun gear 421 and the inner toothed ring. The plurality of the planetary gears 422 are rotatably connected to the planetary gear bracket 423. The output shaft 43 is located at a side of the planetary gear bracket 423 away from the drive part 20 and can rotate synchronously with the planetary gear bracket 423.

Specifically, the planetary gear bracket 423 is provided with multiple bare axles 424, and each of the plurality of planetary gears 422 is sleeved on a corresponding bare axle 424. In order to improve the power transmission efficiency of the transmission part 40, a rolling member 425, such as a needle roller bearing or a ball bearing, is embedded between an inner wall of each of the plurality of the planetary gears 422 and the corresponding bare axle 424, so that during rotation of the each of the plurality of planetary gears 422, the sliding friction between each of the plurality of planetary gears 422 and the corresponding bare axle 424 is converted to a rolling friction, which greatly increases the power transmission efficiency, reduces friction noise, and prolongs a service life of the gearbox.

In addition, the transmission part 40 further comprises a first bearing 44 sleeved on the output shaft 43. An inner ring of the first bearing 44 is provided with a limit groove, and the limit groove is provided with an annular elastic ring 45. The annular elastic ring 45 can be sleeved on the output shaft 43 and function in radial backlash elimination.

It can be understood that in other embodiments of the present application, the limit groove can also be provided on the output shaft 43, which is not limited herein.

In this embodiment, referring to FIGS. 2, 3, 8 and 9, the drum motor 100 further comprises a drive part fixing mechanism 50 and a rotating part support mechanism 60. The drive part fixing mechanism 50 is arranged at a first end of the rotating part 30 and partially extends outside the accommodation chamber 31, and the drive part fixing mechanism 50 is used to fix and support an end of the drive part 20 away from the transmission part 40. The rotating part support mechanism 60 is arranged at a second end of the rotating part 30 and partially extends outside the accommodation chamber 31, and the rotating part support mechanism 60 is used to support the rotating part 30.

Specifically, the drive part 20 is a motor, comprising an internally toothed motor casing 21. The drive part fixing mechanism 50 comprises: a motor fixing part 51, a motor connection part 52, and a motor connection fitting part 53. The motor fixing part 51 is hexagonal, and the motor connection part 52 has a certain slight deformation ability. The motor fixing part 51 and the motor connection part 52 have an interference fit and a flat connection to avoid relative rotation of the motor connection part 52. The motor connection part 52 and the motor connection fitting part 53 cooperate with each other through a plurality of convex and concave structures, thereby achieving the fixation of the motor connection fitting part 53. The motor connection part 52 has a certain elastic force, which can offset a part of the external force influence from the motor fixing part 51, thereby preventing the vibration and other external forces which are exerted on the motor fixing part 51 from being transmitted to the motor, and achieving a shock absorption effect. In addition, the motor connection fitting part 53 is in splined connection to the internally toothed motor casing 21 to ensure that the motor itself is fixed by the motor fixing part 51 and cannot rotate, thereby avoiding direct contact between the drive part 20 and the drum.

In addition, the rotating part support mechanism 60 comprises: a fixing part 61, an adapter sleeve 62, and a second bearing 63. The adapter sleeve 62 is partially arranged in the accommodation chamber 31 and is an interference fit with the drum, which can realize the fixed connection between adapter sleeve 62 and the drum, so that the adapter sleeve 62 and the drum can rotate synchronously. The fixing part 61 and the second bearing 63 sleeved on the fixing part 61 are mainly used to support the drum. In practical applications, a drum with a motor output power is usually used to connect multiple unpowered sleeves to achieve reasonable power distribution. For example, when the drum rotates around the rotation axis L, due that the adapter sleeve 62 is fixedly connected to the drum, the adapter sleeve 62 will be driven and start to rotate synchronously. A belt or other connecting piece is sleeved outside an end of the adapter sleeve 62 away from the drum to drive the unpowered sleeves to rotate synchronously, thereby realizing the transmission of objects.

The principle of above-described the drum motor 100 is as follows: one end of the drive part 20 is fixed and supported by a drive part fixing mechanism. When the drive part 20 outputs the power, the power is transmitted to the transmission part 40, and the output shaft 43 of the transmission part 40 drives the tension structure 10 to rotate. Since the installation structures of the limit part 12 and the tension parts 13 are designed to enable a sufficient friction to be generated between each of the tension parts 13 and the inner wall of the drum, the tension structure 10 can drive the drum to rotate. A drum support structure is designed at the other end of the drum and connected to the unpowered sleeves to realize power transmission to multiple unpowered sleeves.

It can be understood that fixing structures for the tension structure 10 and the drive part 20 are used to support two sides of the drive part 20 and the transmission part 40, that is, the motor and the planetary gear box are supported at two sides. The installation is convenient. In case of different motor and transmission ratio requirements, when the length requirements of the motor and the planetary gear box change, it is only required to loosen the bolt of the tension structure 10 and to adjust the position of the bolt to adapt installation requirements of a combination of motor and the planetary gear box with different lengths.

The above-described drum motor 100 adopts a reliable friction generated between the tension parts 10 and the rotating part 30 to realize a fixed connection therebetween, in this way, the rotating part 30 is driven to rotate around the rotation axis L. This connection manner has low requirements on the shape of the tension structure 10, such that the processing accuracy requirement is reduced and it is solved the technical problem that the connection manner between the drum and the sleeve in the existing drum motor imposes high requirements on the processing accuracy and has complex disassembly and assembly. Moreover, the number of the tension parts 13 and the fitting portions 114 can be increased or decreased to meet different requirements for friction and improve applicability.

The above-described embodiments are only used to illustrate the technical solutions of the present application, and are not intended to limit the present application. Although the present application has been described in detail with reference to the foregoing embodiments, those skilled in the art should understand that they can still make modifications to the technical solutions described in the various embodiments or make equivalent substitutions to some of the technical features. Such modification or substitutions do not cause the essence of the corresponding technical solutions to deviate from the spirit and scope of the technical solutions in the embodiments of the present application, and should be included in within the protection scope of the present application.

The invention claimed is:

1. A tension structure for connecting a drive part with a rotating part, the tension structure being configured to drive the rotating part to rotate about a rotation axis under a driving of the drive part, and the tension structure comprising:
   a first connection part, in transmission connection with the drive part;
   a limit part, comprising a bottom wall and a side wall arranged at a periphery of the bottom wall, wherein the side wall defines therein installation slots; and the bottom wall is detachably connected to the first connection part to enable the side wall to sleeve outside the first connection part;

tension parts, engaged with the installation slots, respectively, wherein a side of each of the tension parts facing away from the first connection part protrudes from a corresponding installation slot and presses against the rotating part;

the side wall comprises a plurality of convex columns which are spaced apart from adjacent ones, sides of each of the plurality of convex columns facing toward adjacent convex columns are provided with grooves, respectively, and each of the grooves and an opposite groove form an installation slot having an installation port; and each of the tension parts comprises limit bosses spacedly arranged at two sides thereof; and the limit bosses are engaged with corresponding grooves, and the tension parts are inserted into the installation slots through the installation ports, respectively.

2. The tension structure according to claim 1, wherein in a direction of the rotation axis, a length of each of the installation slots is smaller than a length of each of the tension parts.

3. The tension structure according to claim 1, wherein a side of each of the tension parts facing away from the first connection part has concavo-convex patterns.

4. The tension structure according to claim 1, wherein along a direction of the rotation axis, the first connection part comprises a first section and a second section in connection with each other; a diameter of the first section is smaller than a diameter of the second section, a step surface is formed at a connection portion between the first section and the second section; and the side wall is sleeved outside the first section, and an end of the side wall away from the bottom wall presses against the step surface.

5. The tension structure according to claim 4, wherein the first connection part further comprises fitting portions protruding from an outer side wall of the first section; each of the fitting portions comprises a first fitting inclined plane; and each of the tension parts is in slidable connection with a corresponding fitting portion; each of the tension parts comprises a second fitting inclined plane; an extending direction of the second fitting inclined plane is inclined to a sliding direction of a corresponding tension part; and the second fitting inclined plane is parallel to and in contact with a corresponding first fitting inclined plane.

6. The tension structure according to claim 4, wherein a receiving chamber is defined in both the first section and the second section, and the first connection part further comprises a connection portion arranged in the receiving chamber; a through hole is defined in the bottom wall; and the tension structure further comprises a fastener, and the fastener passes through the through hole and is in connection with the connection portion.

7. The tension structure according to claim 6, wherein the tension structure further comprises an elastic part and a second connection part accommodated in the receiving chamber; the elastic part is sleeved on the second connection part and engaged with the second section, and the second connection part is configured to connect an output end of the drive part.

8. A tension structure for connecting a drive part with a rotating part, the tension structure being configured to drive the rotating part to rotate about a rotation axis under a driving of the drive part, and the tension structure comprising:

a first connection part, in transmission connection with the drive part;

a limit part, comprising a bottom wall and a side wall arranged at a periphery of the bottom wall, wherein the side wall defines therein installation slots; and the bottom wall is detachably connected to the first connection part to enable the side wall to sleeve outside the first connection part;

tension parts, engaged with the installation slots, respectively, wherein a side of each of the tension parts facing away from the first connection part protrudes from a corresponding installation slot and presses against the rotating part;

along a direction of the rotation axis, the first connection part comprises a first section and a second section in connection with each other; a diameter of the first section is smaller than a diameter of the second section, a step surface is formed at a connection portion between the first section and the second section; and the side wall is sleeved outside the first section, and an end of the side wall away from the bottom wall presses against the step surface.

9. The tension structure according to claim 8, wherein the first connection part further comprises fitting portions protruding from an outer side wall of the first section; each of the fitting portions comprises a first fitting inclined plane; and each of the tension parts is in slidable connection with a corresponding fitting portion; each of the tension parts comprises a second fitting inclined plane; an extending direction of the second fitting inclined plane is inclined to a sliding direction of a corresponding tension part; and the second fitting inclined plane is parallel to and in contact with a corresponding first fitting inclined plane.

10. The tension structure according to claim 8, wherein a receiving chamber is defined in both the first section and the second section, and the first connection part further comprises a connection portion arranged in the receiving chamber; a through hole is defined in the bottom wall; and the tension structure further comprises a fastener, and the fastener passes through the through hole and is in connection with the connection portion.

11. The tension structure according to claim 10, wherein the tension structure further comprises an elastic part and a second connection part accommodated in the receiving chamber; the elastic part is sleeved on the second connection part and engaged with the second section, and the second connection part is configured to connect an output end of the drive part.

12. The tension structure according to claim 8, wherein in a direction of the rotation axis, a length of each of the installation slots is smaller than a length of each of the tension parts.

13. The tension structure according to claim 8, wherein a side of each of the tension parts facing away from the first connection part has concavo-convex patterns.

* * * * *

UNITED STATES PATENT AND TRADEMARK OFFICE
CERTIFICATE OF CORRECTION

| | | |
|---|---|---|
| PATENT NO. | : 12,218,566 B2 | Page 1 of 1 |
| APPLICATION NO. | : 18/714429 | |
| DATED | : February 4, 2025 | |
| INVENTOR(S) | : Shanyao Ke et al. | |

It is certified that error appears in the above-identified patent and that said Letters Patent is hereby corrected as shown below:

On the Title Page

Delete:
"(73) Assignees: SUZHOU ZHAOWEI INDUSTRIAL TECHNOLOGY CO., LTD. / SHENZHEN ZHAOWEI MACHINERY & ELECTROICS CO., LTD." and Insert:
--(73) Assignees: SUZHOU ZHAOWEI INDUSTRIAL TECHNOLOGY CO., LTD. / SHENZHEN ZHAOWEI MACHINERY & ELECTRONICS CO., LTD.--.

Signed and Sealed this
Fifteenth Day of July, 2025

Coke Morgan Stewart
*Acting Director of the United States Patent and Trademark Office*